United States Patent
Berkey

(10) Patent No.: US 7,110,239 B2
(45) Date of Patent: Sep. 19, 2006

(54) POLARITY CORRECTION CIRCUIT AND SYSTEM INCORPORATING THE SAME

(75) Inventor: Thomas F. Berkey, Coral Spring, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 280 days.

(21) Appl. No.: 10/395,867

(22) Filed: Mar. 24, 2003

(65) Prior Publication Data

US 2004/0189806 A1 Sep. 30, 2004

(51) Int. Cl.
*H02H 11/00* (2006.01)

(52) U.S. Cl. .................... 361/245; 361/246

(58) Field of Classification Search ............... 361/82, 361/84, 245, 246; 348/143, 192; 714/799, 714/800

See application file for complete search history.

(56) References Cited

U.S. PATENT DOCUMENTS

| | | | |
|---|---|---|---|
| 5,467,369 A * | 11/1995 | Vijeh et al. ............... 375/224 |
| 5,706,036 A * | 1/1998 | Lam et al. ............... 345/213 |
| 5,727,006 A | 3/1998 | Dreyer et al. |
| 5,748,902 A | 5/1998 | Dalton et al. |
| 5,903,613 A | 5/1999 | Ishida |
| 6,466,989 B1 | 10/2002 | Chu |
| 2003/0058895 A1 * | 3/2003 | Chang et al. ............... 370/532 |

FOREIGN PATENT DOCUMENTS

EP  0 451 276 A1  10/1991
JP  59204336  3/1985

* cited by examiner

*Primary Examiner*—Stephen W. Jackson
*Assistant Examiner*—Danny Nguyen
(74) *Attorney, Agent, or Firm*—Alan M. Weisberg; Christopher & Weisberg, P.A.

(57) ABSTRACT

A polarity correction circuit including a polarity controller and an inversion circuit. The polarity controller is configured to detect an incorrect polarity in a polarity sensitive signal and provide inversion signal in response to the incorrect polarity. The inversion circuit inverts the polarity sensitive signal in response to the inversion signal. A video system consistent including a polarity correction circuit consistent with the invention, and a circuit for correcting mis-wiring of transmit and receive connections are also provided.

4 Claims, 3 Drawing Sheets

POLARITY CORRECTION CIRCUIT AND SYSTEM INCORPORATING THE SAME

FIELD OF THE INVENTION

The present invention relates to data communications systems, and more particularly to a system for automatically correcting reversed polarity in a polarized data communications system.

BACKGROUND OF THE INVENTION

Many communications systems operate using polarized data transmission/reception. Because these communications systems rely on polarized data transmission, the systems are inherently intolerant of installation errors, especially reversal of the transmission wires. Unfortunately, communications systems are often installed by technicians or purchasers that do not have the necessary training and skills. Installation by untrained people often leads to improper installation, including mis-wiring of the communications devices. Even when installed by fully trained technicians, the communications lines may still be occasionally mis-wired, resulting in reversed polarity between interacting devices.

Because of the very nature of polarized communication protocols, any reversal of the polarity may render the system inoperable. A simple switching of wires can thus prevent proper system function. Detecting and correcting wiring problems, therefore, can result in a costly unplanned expense to both the customer and the manufacturer. On the customer's end, not only are there costs associated with lost productivity because the communications system is non-functioning, but there is also the expense of service calls and/or technicians that are required to diagnose and correct the problem. Similarly, the equipment manufacturer must handle equipment that is returned as defective and devote resources to determining if there actually is a problem with the returned equipment.

The problems associated with mis-wiring polarized data communications systems are aggravated by the fact that other hardware problems may produce symptoms that are the same as reversed polarity wires. After initial installation, if communication to the product fails either a technician or the customer must try to determine whether the problem is related to a defective device or an installation problem. If the communications system includes many sets of equipment, questionable devices may be exchanged with known working equipment in an attempt to verify if the equipment is indeed faulty. However, the devices that must be checked and/or swapped out may often be located on towers, light poles, etc. making the procedure quite difficult.

As alluded to above, fault diagnosis in non-functioning communications system typically requires verifying that both ends of the communications system are functioning and installed correctly. However, during trouble shooting of the communications system the situation often arises where the equipment is suspect for any number of reasons. Checking the wiring of the communications devices requires removing mounting bases etc. from high ceilings, towers or remote locations, and is an onerous task undertaken as a last resort. As a result a great deal of time and effort may be wasted trying to detect hardware defects when the system is simply mis-wired.

Accordingly there is a need for a system and method of automatically correcting incorrect polarity in a communicated signal.

SUMMARY OF THE INVENTION

A polarity correction circuit consistent with the invention includes: a polarity controller and an inversion circuit. The polarity controller is configured to detect an incorrect polarity in a polarity sensitive signal and provide an inversion signal in response to the incorrect polarity. The inversion circuit inverts the polarity sensitive signal in response to the inversion signal. A video system consistent with the invention includes: first and second video system devices, a transmission medium for communicating at least one polarity sensitive signal between said first and second video system devices, and a polarity correction circuit consistent with the invention.

According to another aspect of the invention, there is provided a circuit for automatically correcting mis-wiring of transmit and/or receive connections. The circuit includes: at least one receiving terminal for receiving an input signal and/or at least one transmitting terminal for transmitting an output signal, a controller configured to detect an incorrect connection of the input signal to the at least one transmitting terminal and provide at least one exchange signal in response to the incorrect connection, and an inversion circuit configured to exchange the receiving and transmitting terminals in response to the exchange signal.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

The present invention will be described herein in connection with various exemplary embodiments thereof related to a video system wherein data is transmitted between a video camera and a controller. It is to be understood, however, that the embodiments described herein are presented by way of illustration, not of limitation. The present invention may be incorporated into a wide variety of communications systems utilizing a polarized data transmission protocol without departing from the spirit and scope of the invention.

Figure 1:
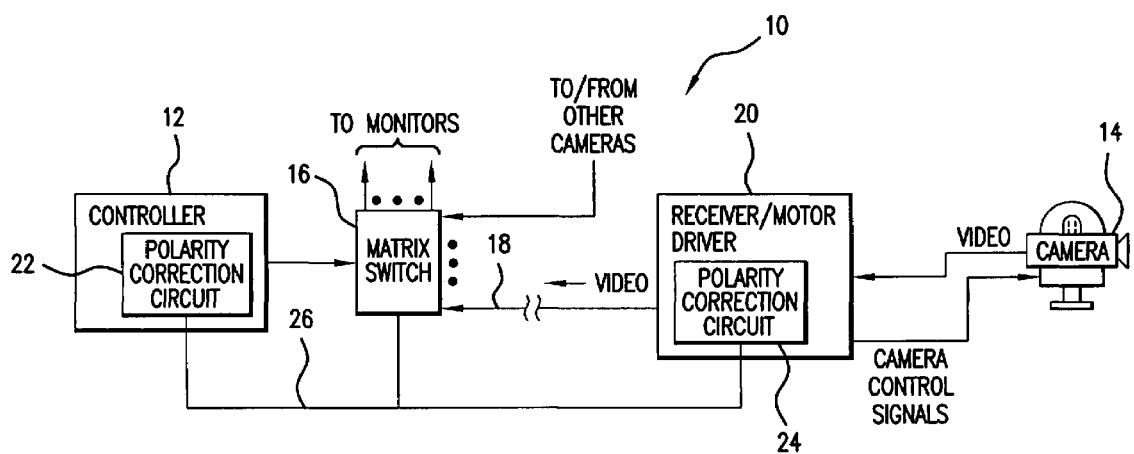
FIG. 1 is a block diagram of an exemplary system consistent with the invention.

Turning now to FIG. 1, there is illustrated, in simplified block diagram form, an exemplary closed circuit video surveillance system 10 including a polarity correction consistent with the invention. The system 10 includes: a system control device or controller 12 for controlling operation of one or more video cameras. For simplicity and ease of explanation, only one video camera 14 is explicitly illustrated. The system 10 also includes a number of video monitors, which are not shown, and a matrix switch 16 for routing video signals from cameras selected through the control device 12 so that the video signals from the selected cameras are displayed on monitors which are also selected through the control device 12.

Each of the cameras, including camera 14, is connected for transmitting video signals to the matrix switch 16 by means of a transmission medium 18. Again, for simplicity, the transmission medium in FIG. 1 is a cable 18 associated with the camera 14. The transmission medium 18 may however be any medium capable of transmitting communication signals between two electronic devices, such as a coaxial cable, twisted pair wire, fiber optic cable, air, etc.

A receiver/motor driver 20 may be provided, either as an integral part of the camera or as a separate component. Video signals generated by the camera 14 may be output from the camera 14 to the circuit 20, which in turn couples the video signals to the cable 18 for transmission to the matrix switch 16. In the illustrated exemplary embodiment, a separate transmission medium 26 provides a communication path between the receiver/motor control circuit 20, the matrix switch, and the controller. Each of these components may transmit and/or receive data associated with control of the video system over the transmission medium 26.

For example, the camera 14 may be a video dome-type camera in which camera operating characteristics including direction of view, zoom condition, focus, etc., can be changed by remote control. More specifically, the control signals may be transmitted through the transmission medium 26 from the controller 12 and received and detected at the receiver circuit 20. After suitable conditioning, the control signals may be transmitted from the receiver circuit 20 to control the motors (not separately shown) associated with the camera 14. In response to the control signals received at the camera, motors are controlled to change the camera's operating characteristics. In addition, the camera may provide status or other information to the controller, e.g. through the matrix switch or directly to the controller, over the transmission medium 26.

Signals communicated between devices, e.g. in a video system, may be polarity sensitive. The term "polarity sensitive" is used herein to describe a signal encoded with data in a manner whereby the data would not be correctly interpreted by a receiver if received with incorrect polarity. Polarity sensitive signals may be signals encoded with data using a polarized encoding scheme. Polarized encoding schemes include, for example, NRZ-Level, RZ and Manchester-type schemes.

Signals encoded with non-polarized encoding schemes, such as NRZ-Mark, NRZ-Space, Manchester-Differential, Bi-Phase-Mark, Bi-Phase-Space, Miller, and Bipolar encoding schemes, are typically not polarity sensitive. Those skilled in the art will, however, recognize that some applications use non-polarized encoding schemes in a short burst mode and require the leading edge of the first transition to be a rising edge, etc. In such applications, non-polarized encoding schemes are used to encode a polarity sensitive signal.

Advantageously, a system 10 consistent with the invention is configured to automatically detect and correct the polarity of polarity sensitive signals communicated with incorrect polarity, e.g. by mis-wiring of the communication cables. In the illustrated exemplary system 10, for example, the controller 12 and the receiver/motor driver 20, each include a polarity correction circuit 22, 24 for correcting the polarity of polarity sensitive signals transmitted or received thereby. The system 10 is provided only by way of example. It is to be understood, therefore, that one or more polarity correction circuits may be provided for polarity correction of a polarity sensitive signal transmitted between any two or more devices configured for transmitting and/or receiving data, e.g. any two or more video system devices. For example, polarity correction may be provided only at the receiver/motor driver 20, or controller 12, or in all system components including the matrix switch 16.

In general, the polarity correction circuits 22, 24 monitor both the transmit (TX) and receive (RX) signals to determine if an anticipated data encoding feature or pattern in a transmitted or received polarity sensitive signal is present. Depending on system configuration, transmitter polarity may not be easily detectable in a direct fashion at the polarity correction circuit. In such a case, feedback from a receiving device may be provided, or a transmitted signal could be transmitted with a first polarity and polarity could be switched if the system does not respond properly. When an incorrect data pattern or feature is detected, the signal polarity is automatically inverted, thus effectively correcting any mis-wiring of the communication cables. Polarity correction consistent with the invention is thus achieved without operator intervention, thereby efficiently obviating the effects of incorrect wiring of communication cables.

Figure 2:
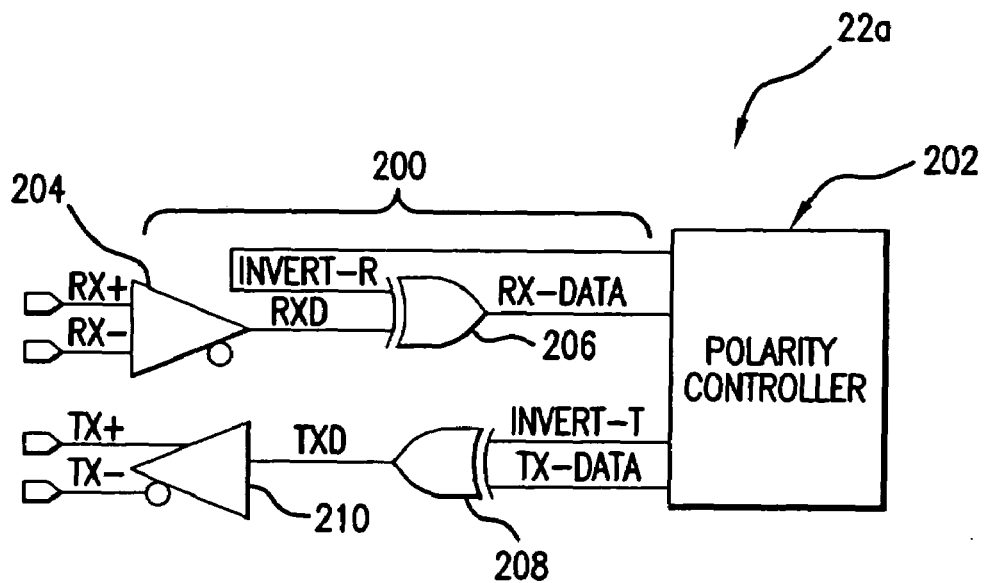
FIG. 2 is a circuit diagram of an exemplary polarity correction circuit consistent with the invention.

Turning now to FIG. 2, there is illustrated and exemplary polarity correction circuit 22a consistent with the invention. The circuit 22a generally includes a polarity correcting inversion circuit 200 and a polarity controller 202. The inversion circuit 200 is configured to receive and transmit communicated signals and to correct any incorrect polarity in the signals as detected by the polarity controller. Those skilled in the art will, of course, recognize that a polarity correction circuit consistent with the invention may be implemented in a variety of configurations with a variety of circuit components.

In the illustrated exemplary embodiment, the inversion circuit 200 includes a differential transceiver 204 for receiving positive RX+ and negative RX− representations of received data, and providing an RXD output representative of the received data. The RXD output of the transceiver is provided as an input to the exclusive-OR (XOR) gate 206, which also receives at its input an inversion signal INVERT-R from the controller 202. The output of the XOR gate is the received data RX-DATA and is provided as an input to the polarity controller 202.

The inversion circuit 200 also includes an XOR gate 208 having data to be transmitted TX-DATA at one input, and an inversion signal INVERT-T from the polarity controller 200 at another input. The output of the XOR gate 208 is correctly polarized data to be transmitted TXD, and is provided at the input of a differential transceiver 210 for providing positive TX+ and negative TX− representations TXD on an appropriate communication cable.

In the illustrated embodiment, the polarity controller 202 corrects polarity in the RX-DATA and TX-DATA by controlling the state of the INVERT-R and INVERT-T signals, respectively. The polarity controller 202 may be a pre-programmed micro-controller/processor, FPGA sequencer, etc. configured to monitor the RX-DATA and TX-DATA signals for an anticipated and known data encoding feature or pattern. Those skilled in the art will recognize that various data encoding schemes produce polarity sensitive signals having well-defined patterns or features. A polarity controller consistent with the invention may be configured to detect any of such features for determining whether a signal is received or transmitted with incorrect polarity.

For example, un-modulated encoding schemes typically use start bits and stop bits etc, and normally idle with a steady low or high level on the data lines. For a particular scheme, the polarity controller may monitor the anticipated idle state to determine if correct signal polarity is represented. Most polarized, modulated communications protocols idle such that the decoded data is in a high or a low condition. Periods of stable data, longer than would occur in a valid data packet, can be assumed to be an idle state. The idle state can also be detected in systems designed to idle on flag characters (7EH etc.).

Also, encoded protocol schemes, such as Manchester, Bi-Phase, FMO or FM1 etc., modulate each bit of data with the corresponding bit-clock on the same pair of wires. In these schemes, the transmitted data will either: (1) always have a transition in the middle of a bit cell period and occasionally omit transitions at the cell boundaries based on data content or (2) always have transitions at the cell boundaries and occasionally omit transitions in the middle of the cell, based on data content. In each of these protocols, the cell boundaries can be established when the first wide pulse (1 bit period wide) is received in the data. The bit-cell boundaries may be established by any of the several methods for locking onto bit-cell boundaries known to those skilled in the art. Once the boundary is established, the data can be monitored to establish correct data polarity during idle line states.

Operation of the exemplary embodiment illustrated in FIG. 2 in connection with a received signal having incorrect polarity will now be described in connection with the timing diagram 300 of FIG. 3. For simplicity and ease of explanation, operation with respect to correction of polarity in a signal to be transmitted is not illustrated. Those skilled in the art will recognize, however, that incorrect polarity in signal to be transmitted TX-DATA may be corrected in a manner quite similar to that described in connection with a received signal, i.e. by assertion of the INVERT-T signal x to a logic "1" or high level.

Figure 3:
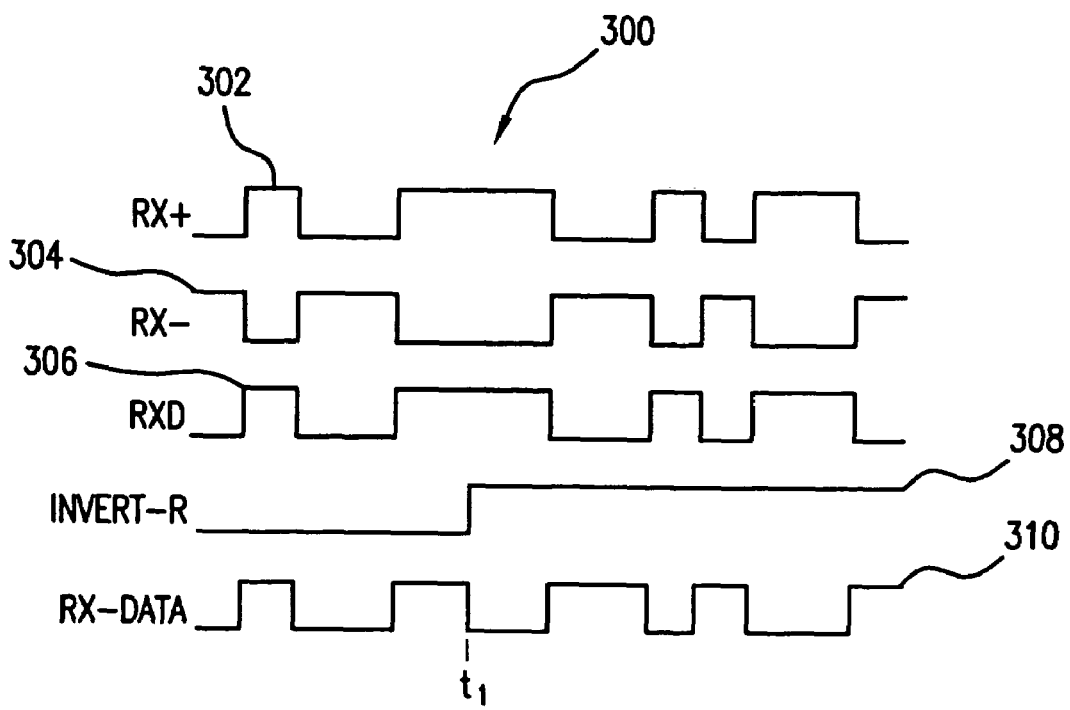
FIG. 3 is a timing diagram associated with the exemplary polarity correction circuit illustrated in FIG. 2.

FIG. 3 illustrates an RX+ signal 302 and an RX− signal 304 encoded with data using an NRZ-level encoding scheme, but with incorrect polarity. By "incorrect polarity" it is meant that the signal applied to RX+ should have been applied to RX−, and vice-versa. As mentioned above, this may occur, for example by mis-wiring of data transmitted over a two-wire transmission medium. The RXD output 306 of the differential transceiver corresponds to the RX+ data stream 302. Until incorrect polarity in the signal is detected by the controller at time t1, the INVERT-R signal 308 is held at a logic "0" (zero) by the controller, and the RX-DATA output 310 of the XOR gate corresponds to the RX+ data.

When controller determines that RX-DATA does not exhibit the anticipated data pattern, e.g. correct idle state, the controller may assert the INVERT-R signal 308 at a logic "1" (one) or high state, e.g. at time $t_1$. This change in the INVERT-R signal 308 causes inversion of the output RX-DATA output 310. Following time $t_1$, the RX-DATA output 310 corresponds to the RX− data signal 304. By appropriate assertion of the INVERT signal the controller thus inverts the received data to automatically correct data polarity in a signal received with incorrect polarity. No operator intervention is required, leading to a facile and efficient solution to the problems associated with mis-wiring of communications cables carrying polarization sensitive signals.

Figure 4:
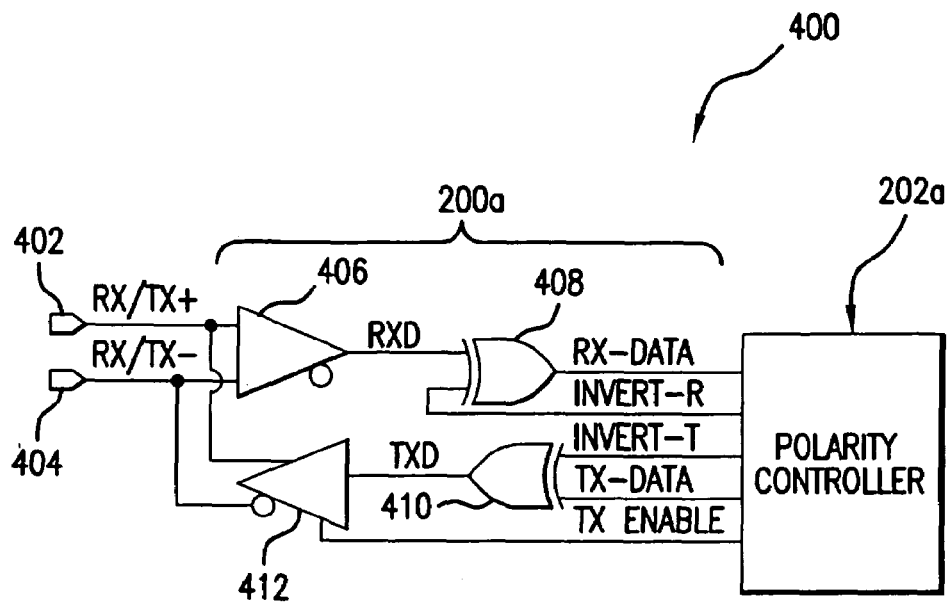
FIG. 4 is a circuit diagram of another exemplary polarity correction circuit consistent with the invention.

A variety of polarity correction circuit configurations are possible. FIG. 4, for example, illustrates an exemplary embodiment 400 of a polarity correction circuit configured for bi-directional differential data inversion. In the illustrated embodiment, data is received and transmitted on a single pair of input/output (i/o) pins 402, 404. A differential transceiver 406 receives positive RX+ and negative RX− representations of received data and provides an RXD output representative of the received data. The RXD output of the transceiver 406 is provided as an input to the exclusive-OR (XOR) gate 408, which also receives at its input an inversion signal INVERT-R from the controller 202a. The output of the XOR gate 408 is the received data RX-DATA, and is provided as an input to the polarity controller 202a.

The circuit also includes an XOR gate 410 having data to be transmitted TX-DATA at one input, and an inversion signal INVERT-T from the polarity controller 202a at another input. The output of the XOR gate 410 is correctly polarized data TXD to be transmitted, and is provided at the input of a differential transceiver 412 for providing positive TX+ and negative TX− representations TXD on the same pins 402, 404 at which RX+ and RX− inputs, respectively, are received.

Consistent with the invention, the controller 202a may detect incorrectly polarized RX-DATA or TX-DATA and invert such data to correct polarization by appropriately asserting the INVERT-R and/or INVERT-T signals, respectively. To enable transmission of the TXD output on pins 402, 404 the controller provides a TX ENABLE signal to the differential transceiver 412. When, for example, TX ENABLE is not asserted, the polarity controller 202a receives data through the differential transceiver 406, and when TX ENABLE is asserted it transmits data on pins 404,404 through differential transceiver 406.

For RS-422 protocols using 4-wires, it has been recognized that in addition to wiring with incorrect polarity, system installers may inadvertently couple the transmit wires to receiving terminals, and vice-versa. It has been recognized, for example, that this occurs when using RJ-45-style connectors that can be crimped on the cable upside-down. Advantageously, a polarity correction circuit consistent with the invention may be configured to automatically interchange the transmit and receive terminals and/or automatically correct polarity in transmit and receive signals.

Figure 5:
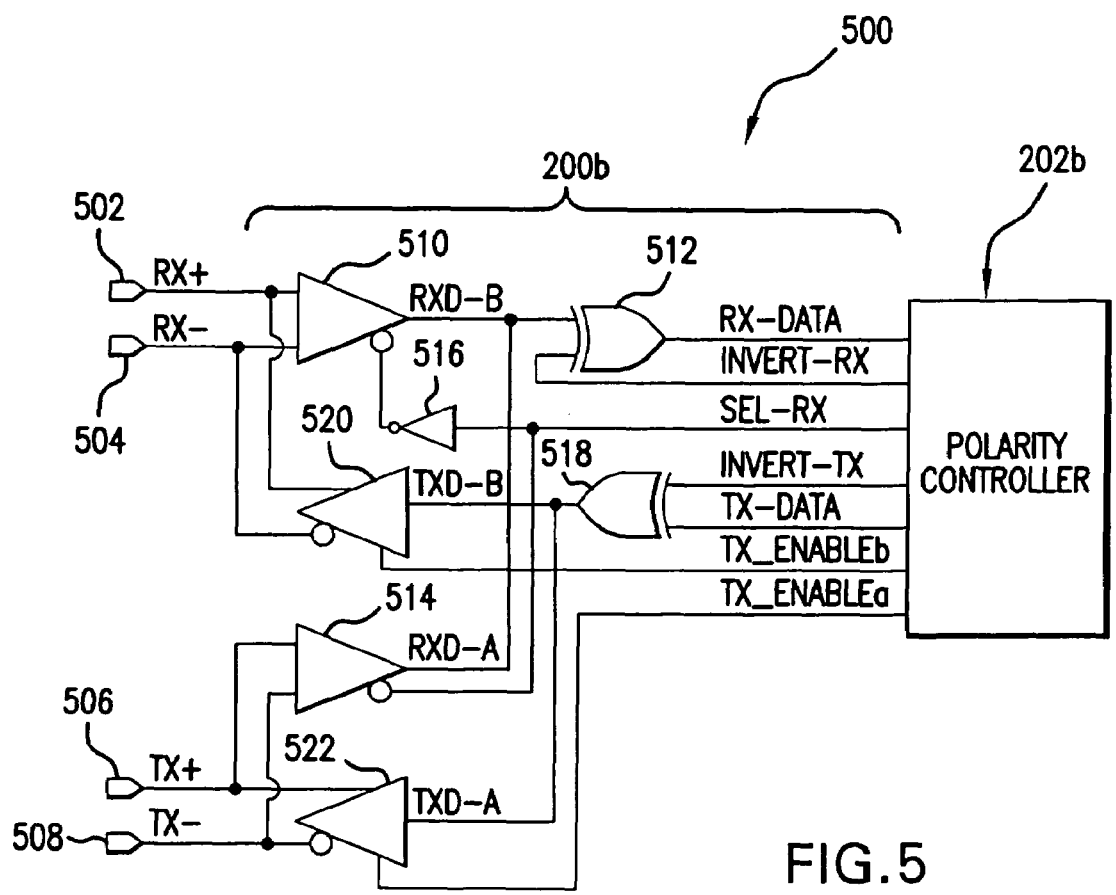
FIG. 5 is a circuit diagram of another exemplary polarity correction circuit consistent with the invention.

FIG. 5 illustrates an exemplary embodiment 500 of a polarity correction circuit for automatically interchanging transmit and receive terminals and/or correcting data polarity consistent with the invention. In the illustrated embodiment, data may be received and transmitted on each of two pairs of i/o pins 502, 504 and 506, 508. A differential transceiver 510 receives positive RX+ and negative RX− representations of received data and provides an RXD-B output representative of the data received through differential transceiver 510. The RXD-B output of the transceiver is provided as an input to the exclusive-OR (XOR) gate 512, which also receives at its input an INVERT-RX signal from the controller 202b. The output of the XOR gate 512 is the received data RX-DATA, and is provided as an input to the polarity controller.

Data may also be received at the input of differential transceiver 514, which provides an RXD-A output to the input of the XOR gate 512 on which RXD-B is provided. Data RXD-A is transmitted through differential transceiver 514 when the transceiver is enabled by a select signal SEL_RXa from the controller 202b. The SEL_RXa output is provided to the enable input of transceiver 510 through an inverter 516 so that RXD-B is transmitted through differential transceiver 510 when the transceiver SEL_RXa held at a logic "0" by the controller 202b.

The circuit 500 also includes an XOR gate 518 having data to be transmitted TX-DATA at one input, and an INVERT-TX signal from the polarity controller 202b at another input. The output of the XOR gate 518 is correctly polarized data to be transmitted TXD-A, TXD-B, and is provided at the inputs of first 520 and second 522 differential transceivers. Data TXD-B is transmitted through differential transceiver 520 when the transceiver is enabled by a TX_ENABLEb output from the controller 202b. Data TXD-A is transmitted through differential transceiver 522 when the transceiver is enabled by a TX_ENABLEa output from the controller 202a.

Consistent with the invention, the controller may detect incorrectly polarized RX-DATA or TX-DATA and invert such data to correct polarization by appropriately asserting the INVERT-RX or INVERT-TX inputs to XOR gates 512 and 518, respectively. In addition, the controller may be configured to detect which of the pairs of i/o pins 502, 504 and 506,508 are coupled to the appropriate transmit and receive signals. Detection can be achieved, for example by monitoring the RX-DATA output of the XOR gate 512 while alternately selecting and thereby monitoring input pairs by driving the SEL-Rxa signal high or low. When the active receive pair is established, the other pair may be used as the transmit pair by driving the appropriate TX_ENABLE line. In normal operation, the SEL-RXa output of the controller 202a may be held at a logic "0" to enable data to be received through differential transceiver 510, and TX_ENABLEa may be asserted to allow data to be transmitted through differential transceiver 522. If anticipated data is not received, then the controller 202b may assert SEL-RXa to enable data to be received through the differential transceiver 514. Thus, the terminals on which data is received can be corrected to obviate a mis-wiring of the transmit and receive signals by controlling the state of the SEL-RXa controller output.

There is thus provided a system and method for automatically correcting polarity of a communicated polarity sensitive signal. The system includes a polarity correction circuit for detecting incorrect/reversed polarity. If reversed polarity is detected a controller, e.g. a sequencer or micro-processor, may be employed to invert the data using, for example, an XOR logic device. Similarly, if the transmit and receive wires are reversed, the error may be detected and corrected by monitoring both the TX and RX signals of the system. Combinations of the illustrated and described techniques may be used to correct many common wiring errors.

It will be appreciated that the functionality described for the embodiments of a polarity correction consistent with the invention may be implemented using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A circuit comprising:
   a polarity controller configured to detect an incorrect polarity in a polarity sensitive signal and provide inversion signal in response to said incorrect polarity; and
   an inversion circuit configured to invert said polarity sensitive signal in response to said inversion signal, said inversion circuit comprising:
   at least one receiving terminal for receiving an input signal; and
   at least one transmitting terminal for transmitting an output signal;
   wherein said inversion circuit comprises first and second transceivers coupled to said at least one receiving terminal and third and fourth transceivers coupled to said at least one transmitting terminal,
   said first and third transceivers being configured to provide an output representative of said input signal with said first transceiver being normally enabled and said third transceiver being normally disabled, and said second and fourth transceivers being configured to provide an output representative of said output signal with said fourth transceiver being normally enabled and said second transceiver being normally disabled, and
   wherein said controller is further configured to detect an incorrect connection of said input signal to said at least one transmitting terminal and provide a select signal in response to said incorrect connection, and
   wherein said inversion circuit is configured to exchange said receiving and transmitting terminals in response to said select signal, wherein upon detection of said input signal on said transmitting terminal said select signal disables said first and fourth transceivers and enables said second and third transceivers to exchange said receiving and transmitting terminals.

2. A circuit comprising:
   at least one receiving terminal for receiving an input signal and at least one transmitting terminal for transmitting an output signal;
   a controller configured to detect an incorrect connection of said input signal to said at least one transmitting terminal and provide at least one select signal in response to said incorrect connection; and
   an inversion circuit configured to exchange said receiving and transmitting terminals in response to said at least one select signal, said inversion circuit comprising first and second transceivers coupled to said at least one receiving terminal and third and fourth transceivers coupled to said at least one transmitting terminal,
   said first and third transceivers being configured to provide an output representative of said input signal with said first transceiver being normally enabled and said third transceiver being normally disabled,
   and said second and fourth transceivers being configured to provide an output representative of said output signal with said fourth transceiver being normally enabled and said second transceiver being normally disabled, and
   wherein upon detection of said input signal on said transmitting terminal said at least one select signal disables said first and fourth transceivers and enables said second and third transceivers to exchange said receiving and transmitting terminals.

3. A circuit according claim 2, wherein at least one of said input signal and said output signal is a polarity sensitive signal, and
- wherein said controller configured to detect an incorrect polarity in said polarity sensitive signal and provide inversion signal in response to said incorrect polarity, and
- wherein said inversion circuit is configured to invert said incorrect polarity in said polarity sensitive signal in response to said inversion signal.

4. A circuit according to claim 2, wherein said controller is configured to detect an incorrect received polarity in a received polarity sensitive signal and provide a first one of said inversion signals in response to said incorrect received polarity, and wherein said controller is configured to detect an incorrect transmitted polarity in a transmitted polarity sensitive signal and provide a second one of said inversion signals in response to said incorrect transmitted polarity; and wherein said inversion circuit is configured to invert said received polarity sensitive signal in response to said first inversion signal and to invert said transmitted polarity sensitive signal in response to said second inversion signal.

* * * * *